United States Patent
Kurozumi

(10) Patent No.: US 8,906,581 B2
(45) Date of Patent: Dec. 9, 2014

(54) PROCESS FOR PRODUCING FUEL CELL ELECTRODE BY APPLYING A SUGAR TO A PRECURSOR SUPPORTING A METAL OXIDE AND CONDUCTIVE SUBSTANCE AND CARBONIZING THE SUGAR

(75) Inventor: Tadatoshi Kurozumi, Chiba (JP)

(73) Assignee: Showa Denko K.K., Tokyo (JP)

( * ) Notice: Subject to any disclaimer, the term of this patent is extended or adjusted under 35 U.S.C. 154(b) by 918 days.

(21) Appl. No.: 13/122,681

(22) PCT Filed: Oct. 6, 2009

(86) PCT No.: PCT/JP2009/067385
§ 371 (c)(1),
(2), (4) Date: Apr. 5, 2011

(87) PCT Pub. No.: WO2010/041646
PCT Pub. Date: Apr. 15, 2010

(65) Prior Publication Data
US 2011/0183236 A1    Jul. 28, 2011

(30) Foreign Application Priority Data

Oct. 6, 2008  (JP) ................... 2008-259414

(51) Int. Cl.
*H01M 4/90* (2006.01)
*H01M 4/88* (2006.01)
*H01M 4/86* (2006.01)
*H01M 8/10* (2006.01)

(52) U.S. Cl.
CPC .......... *H01M 4/9016* (2013.01); *H01M 4/8885* (2013.01); *H01M 2004/8689* (2013.01); *H01M 2008/1095* (2013.01); *H01M 4/8605* (2013.01); *H01M 4/8673* (2013.01); *Y02E 60/50* (2013.01); *H01M 4/8892* (2013.01); *H01M 4/9083* (2013.01)
USPC ............ 429/528; 429/523; 429/532; 429/534

(58) Field of Classification Search
CPC ... H01M 4/86; H01M 4/8605; H01M 4/8825; H01M 4/8828; H01M 4/8882; H01M 4/8878
See application file for complete search history.

(56) References Cited

U.S. PATENT DOCUMENTS 7,670,712 B2    3/2010  Ota et al.
2005/0153198 A1    7/2005  Suzuki et al.
(Continued)

FOREIGN PATENT DOCUMENTS

CN    101012057 A    8/2007
CN    101096016 A    1/2008
(Continued)

OTHER PUBLICATIONS

Extended European Search Report dated Dec. 4, 2012 for corresponding European Patent Application No. EP 09 81 9180.
(Continued)

*Primary Examiner* — Maria J Laios
(74) *Attorney, Agent, or Firm* — Sughrue Mion, PLLC

(57) ABSTRACT

The invention provides catalysts that are not corroded in acidic electrolytes or at high potential, have excellent durability and show high oxygen reducing ability. In a process of producing fuel cell electrodes containing a metal oxide and an electron conductive substance, the process includes steps in which a sugar is applied and carbonized on a support layer supporting the metal oxide and the electron conductive substance.

12 Claims, 1 Drawing Sheet

(56) References Cited

U.S. PATENT DOCUMENTS

2007/0128884 A1* 6/2007 Ota et al. .................. 438/778
2007/0259267 A1  11/2007 Ota et al.
2009/0303660 A1* 12/2009 Nair et al. .................. 361/502

FOREIGN PATENT DOCUMENTS

| JP | 2003-317726 | A | 11/2003 |
| JP | 2005-161203 | A | 6/2005 |
| WO | 2006/019128 | A1 | 2/2006 |
| WO | 2009/017011 | A1 | 2/2009 |

OTHER PUBLICATIONS

Jie Ding, et al.; "Platinum and platinum-ruthenium nanoparticles supported on ordered mesoporous carbon and their electrocatalytic performance for fuel cell reactions"; Electrochimica Acta; Elsevier Science Publishers; vol. 50, No. 15; May 20, 2005; pp. 3131-3141; XP027694369.

Marta Sevilla, et al.; "Saccharide-based graphitic carbon nanocoils as supports for PtRu nanoparticles for methanol electrooxidation"; Journal of Power Sources; Elsevier SA; vol. 171, No. 2; Sep. 8, 2007; pp. 546-551; XP022238060.

* cited by examiner

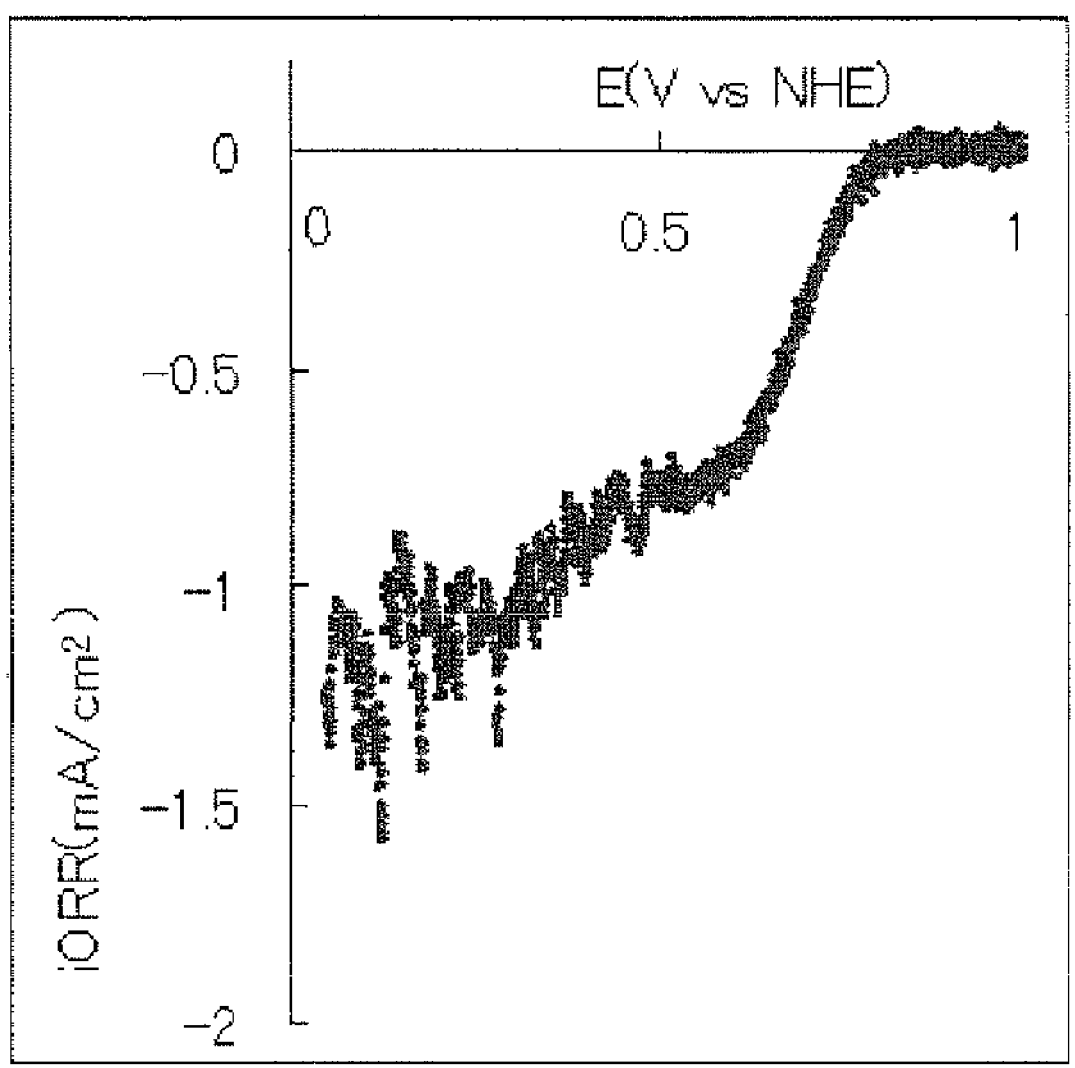

PROCESS FOR PRODUCING FUEL CELL ELECTRODE BY APPLYING A SUGAR TO A PRECURSOR SUPPORTING A METAL OXIDE AND CONDUCTIVE SUBSTANCE AND CARBONIZING THE SUGAR

TECHNICAL FIELD

The present invention relates to processes for producing fuel cell electrodes, and uses of the electrodes.

BACKGROUND ART

Fuel cells are classified into several types according to the electrolytes or electrodes used therein. Typical types are alkaline types, phosphoric acid types, molten carbonate types, solid electrolyte types and polymer electrolyte types. In particular, polymer electrolyte fuel cells that can operate at temperatures ranging from low temperatures (about −40° C.) to about 120° C. attract attention and are progressively developed and practically used as low-pollution power sources for automobiles.

To increase the reaction rate in fuel cells and enhance the energy conversion efficiency, a layer containing a catalyst is conventionally provided on the surface of a cathode (air electrode) material or an anode (fuel electrode) material of fuel cells. (Hereinafter, electrodes in which a catalyst-containing layer is provided on the surface of a cathode material or an anode material will be also referred to as the fuel cell electrodes.)

Platinum that has high activity has been generally used as the catalyst. However, since platinum is expensive and exists in a limited amount, alternative catalysts have been desired.

Metal oxides are possible alternative catalysts to platinum. Further, to increase oxygen reduction potential, metal oxides containing nitrogen or carbon, such as metal oxynitrides, metal oxycarbides and metal oxycarbonitrides, have been studied as catalysts.

However, these metal compounds have so high electric resistance that they do not pass an electric current. Because of this drawback, electron conductive particles are used in combination therewith.

For example, Patent Literature 1 discloses an oxygen-reducing electrode material using a metal oxynitride as a catalyst.

However, even this electrode permits the passage of far below current than practically required.

CITATION LIST

Patent Literature

Patent Literature 1: JP-A-2005-161203

SUMMARY OF INVENTION

Technical Problem

It is an object of the invention to provide processes for producing fuel cell electrodes which are not corroded in acidic electrolytes or at high potential, have excellent durability and can pass a high current.

Solution to Problem

The present inventors studied diligently to solve the problems in the art described hereinabove. They have then found that in a process of producing fuel cell electrodes containing a metal oxide and an electron conductive substance, the process can produce electrodes that are not corroded in acidic electrolytes or at high potential, have excellent durability and can pass a high current by adopting steps in which a sugar is applied and carbonized on a support layer supporting the metal oxide and the electron conductive substance. The present invention has been completed based on the finding.

For example, the present invention is concerned with the following (1) to (12).

(1) A process for producing fuel cell electrodes, comprising first to fourth steps described below:
First Step:
  a step in which a precursor (A) is produced by supporting a metal oxide and an electron conductive substance on a support layer;
Second Step:
  a step in which a precursor (B) is produced by applying a sugar to the precursor (A) obtained in the first step;
Third Step:
  a step in which a precursor (C) is obtained by carbonizing the sugar contained in the precursor (B); and
Fourth Step:
  a step in which a fuel cell electrode is produced by applying a polymer electrolyte to the precursor (C) obtained in the third step.

(2) The process for producing fuel cell electrodes as described in (1), wherein the sugar is sucrose.

(3) The process for producing fuel cell electrodes as described in (1) or (2), wherein the sugar in the second step is applied by a method in which the sugar is dissolved in a solvent to give a solution and the solution is applied.

(4) The process for producing fuel cell electrodes as described in any one of (1) to (3), wherein the carbonization in the third step is carried out by heating and thermally decomposing the sugar.

(5) The process for producing fuel cell electrodes as described in any one of (1) to (3), wherein the carbonization in the third step is carried out by dehydrating the sugar.

(6) The process for producing fuel cell electrodes as described in any one of (1) to (5), wherein the metal oxide is at least one selected from the group consisting of metal oxynitrides, metal oxycarbides and metal oxycarbonitrides.

(7) The process for producing fuel cell electrodes as described in any one of (1) to (6), wherein the metal oxide is an oxide of at least one metal selected from the Group IV and V transition metals.

(8) The process for producing fuel cell electrodes as described in (7), wherein the Group IV and V transition metals are titanium, zirconium, tantalum and niobium.

(9) The process for producing fuel cell electrodes as described in any one of (1) to (8), wherein the electron conductive substance is carbon.

(10) A fuel cell electrode obtainable by the process described in any one of (1) to (9).

(11) A membrane electrode assembly comprising a cathode, an anode and an electrolyte membrane interposed between the cathode and the anode, wherein the cathode and/or the anode is the fuel cell electrode described in (10).

(12) A polymer electrolyte fuel cell comprising the membrane electrode assembly described in (11).

Advantageous Effects of Invention

The fuel cell electrodes produced by the processes according to the invention are stable and are not corroded in acidic electrolytes or at high potential, can pass a high current, and are inexpensive compared to fuel cell electrodes using platinum. The fuel cells having the fuel cell electrodes are therefore relatively inexpensive and have high performance.

BRIEF DESCRIPTION OF DRAWING

FIG. 1 shows a current-potential curve obtained with a catalyst in Example 1.

DESCRIPTION OF EMBODIMENTS

A process for producing fuel cell electrodes according to the present invention includes first to fourth steps described below:

First Step:
a step in which a precursor (A) is produced by supporting a metal oxide and an electron conductive substance on a support layer;

Second Step:
a step in which a precursor (B) is produced by applying a sugar to the precursor (A) obtained in the first step;

Third Step:
a step in which a precursor (C) is obtained by carbonizing the sugar contained in the precursor (B); and Fourth Step:
a step in which a fuel cell electrode is produced by applying a polymer electrolyte to the precursor (C) obtained in the third step.

These steps will be described hereinbelow.

<First Step>

In the first step, a precursor (A) is produced by supporting a metal oxide and an electron conductive substance on a support layer.

The support layer is a layer which diffuses gas in the use of the fuel cell (hereinafter, also the gas diffusion layer). The gas diffusion layers are not particularly limited as long as they have electron conductivity, high gas diffusion properties and high corrosion resistance. Carbon-based porous materials such as carbon paper and carbon cloth, and stainless steel and anticorrosive-coated aluminum foils for weight reduction may be generally used. Specific examples of the support layers include glassy carbon electrodes (manufactured by Tokai Carbon Co., Ltd.).

A metal oxide and an electron conductive substance separately obtained by established methods are supported on the support layer. The supporting methods are not particularly limited. In a general embodiment, a metal oxide and an electron conductive substance may be suspended in a solution, and the suspension may be applied to the support layer and dried.

<Metal Oxides>

The fuel cell electrodes of the invention contain a metal oxide as a catalyst. Examples of the metal oxides include compounds formed of a metal and oxygen, metal oxynitrides formed of a metal, oxygen and nitrogen, metal oxycarbides formed of a metal, oxygen and carbon, and metal oxycarbonitrides formed of a metal, oxygen, nitrogen and carbon. To increase the oxygen reduction potential, metal oxynitrides, metal oxycarbides and metal oxycarbonitrides are preferable. Two or more kinds selected from metal oxynitrides, metal oxycarbides and metal oxycarbonitrides may be used. In the present invention, the compounds formed of a metal and oxygen, the metal oxynitrides, the metal oxycarbides and the metal oxycarbonitrides are collectively referred to as the metal oxides.

The metal oxides are not particularly limited, but preferred metal oxides are oxides of at least one metal selected from the Group IV and V transition metals because they are not corroded in acidic electrolytes or at high potential. Preferred Group IV and V transition metals are titanium, zirconium, tantalum and niobium.

The metal oxides used in the invention may be produced by common methods. For example, a metal compound may be heat treated in an oxygen-containing atmosphere to give a compound formed of a metal and oxygen; a metal compound may be heat treated in an atmosphere containing nitrogen and oxygen to give a metal oxynitride; a metal compound may be mixed with carbon and heat treated in an oxygen-containing atmosphere to give a metal oxycarbide; and a metal compound may be mixed with carbon and heat treated in an atmosphere containing nitrogen and oxygen to give a metal oxycarbonitride.

Examples of the metal oxides include niobium monoxide (NbO), niobium dioxide ($NbO_2$), triniobium pentoxide ($Nb_3O_5$), titanium trioxide ($Ti_2O_3$) and titanium monoxide (TiO). Specific examples include niobium dioxide ($NbO_2$), titanium trioxide ($Ti_2O_3$), niobium carbonitride, titanium carbonitride, zirconium carbonitride, niobium oxycarbonitride, titanium oxycarbonitride and zirconium oxycarbonitride.

<Electron Conductive Substances>

Examples of the electron conductive substances include carbons, conductive polymers, conductive ceramics, metals and conductive inorganic oxides such as tungsten oxide and iridium oxide. These substances may be used singly or in combination with one another. In particular, single carbon or a mixture of carbon and other electron conductive particles is preferable as the electron conductive substance because carbon generally has a large specific surface area. That is, the fuel cell electrode according to a preferred embodiment contains the catalyst and carbon.

Examples of the carbons include carbon blacks, graphites, black leads, activated carbons, carbon nanotubes, carbon nanofibers, carbon nanohorns and fullerenes.

In the case of carbon black as an example, particulate carbon black is preferable. If the particle diameter thereof is excessively small, the formation of an electron conductive path is difficult. If the particle diameter is excessively large, the fuel cell electrode tends to reduce gas diffusion properties or the catalyst usage rate tends to be lowered. The average particle diameter is therefore preferably in the range of 10 to 1000 nm, and more preferably 10 to 100 nm.

When the electron conductive particles are carbon black, the mass ratio between the metal oxide and the carbon black that are supported (metal oxide mass:carbon black mass) is preferably in the range of 4:1 to 1000:1.

<Second Step>

In the second step, a precursor (B) is produced by applying a sugar to the precursor (A) obtained in the first step. The sugar is applied to the part of the precursor (A) in which the metal oxide and the electron conductive substance are supported.

<Sugars>

The sugars for use in the invention are not particularly limited as long as they can be carbonized in the third step. Specific examples include sucrose (saccharose), maltose (malt sugar), lactose (milk sugar), cellobiose and trehalose, with sucrose (saccharose) being preferable.

The sugars are preferably applied to the precursors as a solution. The solvents are not particularly limited as long as the sugars can be dissolved therein. Water is preferable because of its low cost and safety.

When a solvent is used, it is dried after the application. In the case where the carbonization in the third step is performed by heating, the solvent may be dried simultaneously with the carbonization.

By controlling the application amount, the amount of carbon generated by the carbonization may be controlled.

The amount of carbon generated by the carbonization is preferably 0.1 to 100% by mass, more preferably 0.5 to 50% by mass, and most preferably 1 to 20% by mass based on the total of the metal oxide, the electron conductive particles and the carbon generated by the carbonization. If the amount of carbon is less than 0.1% by mass, advantageous effects may not be obtained. If the amount of carbon is in excess of 100% by mass, the carbon from the carbonization may cover the surface of the metal oxide to lower its catalytic activity. The amount of the sugars applied in the second step is determined so that the carbonization in the third step will give a carbon amount in the above range.

<Third Step>

In the third step, a precursor (C) is obtained by carbonizing the sugar contained in the precursor (B).

The sugars may be carbonized by any established methods without limitation. Exemplary methods are thermal decomposition by heating the sugars, and dehydration reaction by the action of concentrated sulfuric acid on the sugars.

In the case of thermal decomposition, the heating temperature may vary depending on the sugars used, but is preferably 500 to 1200° C., more preferably 650 to 1100° C., and most preferably 800 to 1000° C.

The heating time may vary depending on the amount of the sugars or conditions such as temperature, but is preferably 10 minutes to 2 hours, more preferably 20 minutes to 1 hour and 30 minutes, and most preferably 30 to 60 minutes. The heating is preferably performed in vacuum or an inert gas atmosphere.

<Fourth Step>

In the fourth step, a fuel cell electrode is produced by applying a polymer electrolyte to the precursor (C). The polymer electrolyte is applied to the part of the precursor (C) in which the sugar has been carbonized.

<Polymer Electrolytes>

The polymer electrolytes are not particularly limited as long as they are commonly used in fuel cell electrodes. Specific examples include perfluorocarbon polymers having a sulfonic acid group (such as NAFION (a 5% NAFION solution (DE521) manufactured by DuPont Kabushiki Kaisha), hydrocarbon polymer compounds having a sulfonic acid group, polymer compounds doped with inorganic acids such as phosphoric acid, organic/inorganic hybrid polymers partially substituted with proton conductive functional groups, and proton conductors composed of a polymer matrix impregnated with a phosphoric acid solution or a sulfuric acid solution. Of these, NAFION (a 5% NAFION solution (DE521) manufactured by Du Pont Kabushiki Kaisha) is preferable.

<Uses>

The fuel cell electrodes obtained by the processes according to the present invention may be used as anodes or cathodes in fuel cells. Since the fuel cell electrodes of the invention have excellent durability and high oxygen reducing ability, they are suitably used in cathodes.

The fuel cell electrodes produced by the processes of the present invention have high oxygen reducing ability and are resistant to corrosion in acidic electrolytes at high potential. Accordingly, the fuel cell electrodes are suited as fuel cell cathodes. In particular, the fuel cell electrodes are suitably used in cathodes of membrane electrode assemblies in polymer electrolyte fuel cells.

Membrane electrode assemblies of the invention have a cathode, an anode and an electrolyte membrane interposed between the cathode and the anode. The cathode and/or the anode is the electrode as described hereinabove.

The electrolyte membranes may be general perfluorosulfonic acid electrolyte membranes or hydrocarbon electrolyte membranes. Further, microporous polymer membranes impregnated with liquid electrolyte, or porous membranes filled with polymer electrolyte may be used.

The membrane electrode assemblies may be used in the production of fuel cells having the membrane electrode assemblies.

The electrode reaction in fuel cells takes place at a three-phase interface (electrolyte-electrode catalyst-reaction gas). The fuel cells are classified according to the electrolytes used, into several types such as molten carbonate fuel cells (MCFC), phosphoric acid fuel cells (PAFC), solid oxide fuel cells (SOFC) and polymer electrolyte fuel cells (PEFC). In particular, the membrane electrode assemblies of the invention may be preferably used in polymer electrolyte fuel cells.

EXAMPLES

The present invention will be described in detail by presenting examples hereinbelow without limiting the scope of the invention.

Example 1

1. Preparation of Metal Oxide 3.2 g (40 mmol) of titanium (IV) oxide ($TiO_2$) and 1.2 g (100 mmol) of carbon black (Vulcan 72 manufactured by Cabot Corporation) were sufficiently crushed and mixed together. The resultant powder mixture was heat treated in a tubular furnace in a nitrogen atmosphere at 1700° C. for 3 hours. The carbonitride obtained was sufficiently crushed, thereby obtaining 2.9 g of powder of the carbonitride.

Subsequently, 300 mg of the powdery carbonitride was heat treated in a tubular furnace at 1000° C. for 3 hours in a nitrogen atmosphere containing 2% by volume of oxygen gas and 4% by volume of hydrogen. The oxycarbonitride obtained was sufficiently crushed, thereby obtaining 270 mg of powder of the oxycarbonitride.

2. Production of Fuel Cell Electrode

The titanium oxycarbonitride in an amount of 0.095 g and carbon black (XC-72 manufactured by Cabot Corporation) weighing 0.005 g were added to 10 g of a solution consisting of isopropyl alcohol:pure water=2:1 by mass. The mixture was ultrasonically stirred to give a suspended mixture. The mixture in a volume of 30 μl was applied on a previously-weighed glassy carbon electrode (diameter: 5.2 mm, manufactured by Tokai Carbon Co., Ltd.) and was dried at 120° C. for 1 hour to give a precursor (A1). The mass of the precursor (A1) was measured, and the mass of the glassy carbon electrode was subtracted therefrom to determine the total amount (A) (g) of the titanium oxycarbonitride and the carbon black supported on the glassy carbon electrode.

Subsequently, 15 μl of a 0.5% by mass aqueous sucrose solution was applied to the precursor (A1) and was dried at 120° C. for 1 hour, thereby obtaining a precursor (B1).

The precursor (B1) was heat treated in a tubular furnace in an argon atmosphere at 850° C. for 60 minutes to give a precursor (C1).

The mass of the precursor (C1) was measured, and the mass of the glassy carbon electrode was subtracted therefrom to determine the total amount (B) (g) of the titanium oxycarbonitride, the carbon black and the carbon generated by the carbonization on the glassy carbon electrode. The amount of carbon (C) (%) generated by the carbonization was calculated from the equation: [(B−A)/B]×100=C, resulting in C=10%.

Further, 10 μl of NAFION (a 5% NAFION solution (DE521) manufactured by Du Pont Kabushiki Kaisha) diluted ten times with isopropyl alcohol was applied to the precursor (C1) and was dried at 120° C. for 1 hour. A fuel cell electrode (1) was thus manufactured.

3. Evaluation of Oxygen Reducing Ability

The fuel cell electrode (1) manufactured above was evaluated for catalytic ability (oxygen reducing ability) as described below.

The fuel cell electrode (1) was polarized in a 0.5 mol/dm$^3$ sulfuric acid solution at 30° C. under an oxygen atmosphere or a nitrogen atmosphere at a potential scanning rate of 5 mV/sec, thereby recording current-potential curves. As a reference, a reversible hydrogen electrode was polarized in a sulfuric acid solution of the same concentration.

From the measurement results, the difference between the reduction current under an oxygen atmosphere and that under a nitrogen atmosphere was obtained.

FIG. 1 shows an oxygen reduction current-oxygen reduction potential curve (hereinafter, the current-potential curve) obtained in the measurement.

The current at 0.6 V (vs. NHE) is shown in TABLE 1. The higher the oxygen reduction current, the higher the catalytic ability (the oxygen reducing ability) of the fuel cell electrode (1).

TABLE 1

|  | Current density at 0.6 V (mA/cm$^2$) |
| --- | --- |
| Example 1 | 0.76 |
| Example 2 | 0.20 |
| Example 3 | 0.18 |
| Comparative Example 1 | 0.40 |
| Comparative Example 2 | 0.03 |
| Comparative Example 3 | 0.01 |
| Comparative Example 4 | 0.04 |

Example 2

1. Preparation of Metal Oxide 4.92 g (40 mmol) of zirconium (IV) oxide (ZrO$_2$) and 1.2 g (100 mmol) of carbon black (Vulcan 72 manufactured by Cabot Corporation) were sufficiently crushed and mixed together. The resultant powder mixture was heat treated in a tubular furnace in a nitrogen atmosphere at 1700° C. for 3 hours. The carbonitride obtained was sufficiently crushed, thereby obtaining 4.7 g of powder of the carbonitride.

Subsequently, 300 mg of the powdery carbonitride was heat treated in a tubular furnace at 1000° C. for 3 hours in a nitrogen atmosphere containing 0.75% by volume of oxygen gas and 4% by volume of hydrogen. The oxycarbonitride obtained was sufficiently crushed, thereby obtaining 280 mg of powder of the oxycarbonitride.

2. Production of Fuel Cell Electrode

The zirconium oxycarbonitride powder in an amount of 0.095 g and carbon black (XC-72 manufactured by Cabot Corporation) weighing 0.005 g were added to 10 g of a solution consisting of isopropyl alcohol:pure water=2:1 by mass. The mixture was ultrasonically stirred to give a suspended mixture. The mixture in a volume of 30 μl was applied on a previously-weighed glassy carbon electrode (diameter: 5.2 mm, manufactured by Tokai Carbon Co., Ltd.) and was dried at 120° C. for 1 hour to give a precursor (A2).

The mass of the precursor (A2) was measured, and the mass of the glassy carbon electrode was subtracted therefrom to determine the total amount (A) (g) of the zirconium oxycarbonitride and the carbon black supported on the glassy carbon electrode.

Subsequently, 30 μl of a 0.5% by mass aqueous sucrose solution was applied to the precursor (A2) and was dried at 120° C. for 1 hour, thereby obtaining a precursor (B2). The precursor (B2) was heat treated in a tubular furnace in an argon atmosphere at 850° C. for 60 minutes to give a precursor (C2).

The mass of the precursor (C2) was measured, and the mass of the glassy carbon electrode was subtracted therefrom to determine the total amount (B) (g) of the zirconium oxycarbonitride, the carbon black and the carbon generated by the carbonization on the glassy carbon electrode. The amount of carbon (C) (%) generated by the carbonization was calculated from the equation: [(B−A)/B]×100=C, resulting in C=19%.

Further, 10 μl of NAFION (a 5% NAFION solution (DE521) manufactured by Du Pont Kabushiki Kaisha) diluted ten times with isopropyl alcohol was applied to the precursor (C2) and was dried at 120° C. for 1 hour. A fuel cell electrode (2) was thus manufactured.

3. Evaluation of Oxygen Reducing Ability

The fuel cell electrode (2) was evaluated for catalytic ability (oxygen reducing ability) as described in Example 1. The current at 0.6 V (vs. NHE) is shown in TABLE 1.

Example 3

1. Production of Fuel Cell Electrode

Titanium oxycarbonitride from Example 1 in an amount of 0.095 g and carbon black (XC-72 manufactured by Cabot Corporation) weighing 0.005 g were added to 10 g of a solution consisting of isopropyl alcohol:pure water=2:1 by mass. The mixture was ultrasonically stirred to give a suspended mixture. The mixture in a volume of 30 μl was applied on a previously-weighed glassy carbon electrode (diameter: 5.2 mm, manufactured by Tokai Carbon Co., Ltd.) and was dried at 120° C. for 1 hour to give a precursor (A3). The mass of the precursor (A3) was measured, and the mass of the glassy carbon electrode was subtracted therefrom to determine the total amount (A) (g) of the titanium oxycarbonitride and the carbon black supported on the glassy carbon electrode.

Subsequently, 30 μl of a 0.5% by mass aqueous sucrose solution was applied to the precursor (A3) and was dried at 120° C. for 1 hour, thereby obtaining a precursor (B3).

The precursor (B3) was soaked in concentrated sulfuric acid for 5 minutes, and was thereafter sufficiently washed with water and dried at 120° C. for 1 hour to give a precursor (C3).

The mass of the precursor (C3) was measured, and the mass of the glassy carbon electrode was subtracted therefrom to determine the total amount (B) (g) of the titanium oxycarbonitride, the carbon black and the carbon generated by the carbonization on the glassy carbon electrode. The amount of carbon (C) (%) generated by the carbonization was calculated from the equation: [(B−A)/B]×100=C, resulting in C=19%.

Further, 10 μl of NAFION (a 5% NAFION solution (DE521) manufactured by Du Pont Kabushiki Kaisha)

diluted ten times with isopropyl alcohol was applied to the precursor (C3) and was dried at 120° C. for 1 hour. A fuel cell electrode (3) was thus manufactured.

2. Evaluation of Oxygen Reducing Ability

The fuel cell electrode (3) was evaluated for catalytic ability (oxygen reducing ability) as described in Example 1. The current at 0.6 V (vs. NHE) is shown in TABLE 1.

Comparative Example 1

1. Production of Fuel Cell Electrode

Titanium oxycarbonitride from Example 1 in an amount of 0.095 g and carbon black (XC-72 manufactured by Cabot Corporation) weighing 0.005 g were added to 10 g of a solution consisting of isopropyl alcohol:pure water=2:1 by mass. The mixture was ultrasonically stirred to give a suspended mixture. The mixture in a volume of 30 μl was applied on a previously-weighed glassy carbon electrode (diameter: 5.2 mm, manufactured by Tokai Carbon Co., Ltd.) and was dried at 120° C. for 1 hour to give a precursor (A4).

Subsequently, 15 μl of a 0.5% by mass aqueous sucrose solution was applied to the precursor (A4) and was dried at 120° C. for 1 hour, thereby obtaining a precursor (B4).

Further, 10 μl of NAFION (a 5% NAFION solution (DE521) manufactured by Du Pont Kabushiki Kaisha) diluted ten times with isopropyl alcohol was applied to the precursor (B4) and was dried at 120° C. for 1 hour. A fuel cell electrode (4) was thus manufactured.

2. Evaluation of Oxygen Reducing Ability

The fuel cell electrode (4) was evaluated for catalytic ability (oxygen reducing ability) as described in Example 1. The current at 0.6 V (vs. NHE) is shown in TABLE 1.

Comparative Example 2

1. Production of Fuel Cell Electrode

A fuel cell electrode (5) was manufactured in the same manner as in Example 2, except that the carbonization treatment (the heat treatment in a tubular furnace in an argon atmosphere at 850° C. for 60 minutes) was not carried out.

2. Evaluation of Oxygen Reducing Ability

The fuel cell electrode (5) was evaluated for catalytic ability (oxygen reducing ability) as described in Example 1. The current at 0.6 V (vs. NHE) is shown in TABLE 1.

Comparative Example 3

1. Production of Fuel Cell Electrode

A fuel cell electrode (6) was manufactured in the same manner as in Example 3, except that the carbonization treatment (the soaking in concentrated sulfuric acid for 5 minutes) was not carried out.

2. Evaluation of Oxygen Reducing Ability

The fuel cell electrode (6) was evaluated for catalytic ability (oxygen reducing ability) as described in Example 1. The current at 0.6 V (vs. NHE) is shown in TABLE 1.

Comparative Example 4

1. Production of Fuel Cell Electrode

Sucrose weighing 1 g was heat treated in a tubular furnace in an argon atmosphere at 850° C. for 60 minutes. The resultant carbon in an amount of 0.02 g, titanium oxycarbonitride from Example 1 in an amount of 0.095 g and carbon black (XC-72 manufactured by Cabot Corporation) weighing 0.005 g were added to 10 g of a solution consisting of isopropyl alcohol:pure water=2:1 by mass. The mixture was ultrasonically stirred to give a suspended mixture. The mixture in a volume of 30 μl was applied on a previously-weighed glassy carbon electrode (diameter: 5.2 mm, manufactured by Tokai Carbon Co., Ltd.) and was dried at 120° C. for 1 hour to give a precursor (A'7).

Further, 10 μl of NAFION (a 5% NAFION solution (DE521) manufactured by Du Pont Kabushiki Kaisha) diluted ten times with isopropyl alcohol was applied to the precursor (A'7) and was dried at 120° C. for 1 hour. A fuel cell electrode (7) was thus manufactured.

2. Evaluation of Oxygen Reducing Ability

The fuel cell electrode (7) was evaluated for catalytic ability (oxygen reducing ability) as described in Example 1. The current at 0.6 V (vs. NHE) is shown in TABLE 1.

Industrial Applicability

The fuel cell electrodes obtained by the processes of the present invention are not corroded in acidic electrolytes or at high potential and have excellent durability and high oxygen reducing ability. The fuel cell electrodes can thus provide high-performance fuel cells.

The invention claimed is:

1. A process for producing fuel cell electrodes, comprising first to fourth steps described below:
   First step:
      a step in which a precursor (A) is produced by supporting a metal oxide and an electron conductive substance on a support layer;
   Second step:
      a step in which a precursor (B) is produced by applying a sugar to the precursor (A) obtained in the first step;
   Third step:
      a step in which a precursor (C) is obtained by carbonizing the sugar contained in the precursor (B); and
   Fourth step:
      a step in which a fuel cell electrode is produced by applying a polymer electrolyte to the precursor (C) obtained in the third step.

2. The process for producing fuel cell electrodes according to claim 1, wherein the sugar is sucrose.

3. The process for producing fuel cell electrodes according to claim 1, wherein the sugar in the second step is applied by a method in which the sugar is dissolved in a solvent to give a solution and the solution is applied.

4. The process for producing fuel cell electrodes according to claim 1, wherein the carbonization in the third step is carried out by heating and thermally decomposing the sugar.

5. The process for producing fuel cell electrodes according to claim 1, wherein the carbonization in the third step is carried out by dehydrating the sugar.

6. The process for producing fuel cell electrodes according to claim 1, wherein the metal oxide is at least one selected from the group consisting of metal oxynitrides, metal oxycarbides and metal oxycarbonitrides.

7. The process for producing fuel cell electrodes according to claim 1, wherein the metal oxide is an oxide of at least one metal selected from the Group IV and V transition metals.

8. The process for producing fuel cell electrodes according to claim 7, wherein the Group IV and V transition metals are titanium, zirconium, tantalum and niobium.

9. The process for producing fuel cell electrodes according to claim 1, wherein the electron conductive substance is carbon.

10. A fuel cell electrode obtainable by the process described in claim 1.

11. A membrane electrode assembly comprising a cathode, an anode and an electrolyte membrane interposed between the cathode and the anode, wherein the cathode and/or the anode is the fuel cell electrode described in claim 10.

12. A polymer electrolyte fuel cell comprising the membrane electrode assembly described in claim 11.

\* \* \* \* \*